UNITED STATES PATENT OFFICE.

CHARLES N. WAITE, OF CRANFORD, NEW JERSEY, ASSIGNOR TO CELLULOSE PRODUCTS COMPANY, OF WILMINGTON, DELAWARE, A CORPORATION OF DELAWARE.

METHOD OF TREATING VISCOSE.

SPECIFICATION forming part of Letters Patent No. 689,337, dated December 17, 1901.

Application filed April 26, 1901. Serial No. 57,591. (No specimens.)

*To all whom it may concern:*

Be it known that I, CHARLES N. WAITE, of Cranford, in the county of Union and State of New Jersey, have invented an Improvement in Methods of Treating Viscose, of which the following is a specification.

In the preparation of viscose as ordinarily carried out after the manner set forth in United States Patent No. 520,770, and especially in the case of treatments specified in United States Patent No. 604,206, having for their object the recovery from the viscose of modified cellulose in the form of sheets or masses, there occurs often an efflorescence of salts, by which the quality and structure of the surface of the sheet or mass are impaired, and also there occurs the formation of minute crystals throughout the substance of the sheet or mass which break down the continuity of the material and reduce its transparency.

This invention has for its object to prevent this efflorescence and also overcome the tendency to the formation of crystals within the mass during drying, whereby the quality of the product is materially improved. I have discovered that this efflorescence during drying may be prevented and its attendant evils avoided, while at the same time the tendency to the formation of crystals within the mass is overcome by the admixture with the viscose of a strong solution of silicate of soda.

In carrying out my invention I prefer to use a solution of silicate of soda of specific gravity 1.37, or, say, about 74° Twaddell, and to incorporate this solution directly with the viscose or the viscose solution, and I prefer to use from fifty to seventy-five per cent. of solution on the weight of the cellulose contained in the viscose.

The viscose or the viscose solution containing silicate of soda as above described may be dried down and otherwise handled for its various application, and especially for the production of sheets or masses, precisely as ordinary viscose without this addition of silicate; but the presence of the silicate during these processes of treatment causes the final product—namely, the recovered cellulose—to be free from the blemishes and imperfections ordinarily occasioned by efflorescence or the formation of crystals. Moreover, as a result of this addition of silicate of soda thick sheets or blocks of recovered cellulose may be prepared by decomposition of the viscose after the general manner set forth in United States Patent No. 604,206, which sheets or blocks or masses when thus prepared from viscose containing silicate of soda as above described are devoid of the granular structure commonly presented in masses of recovered cellulose made from ordinary viscose. By reason of the greater toughness of the masses prepared in accordance with my invention and the absence of granular structure strong and tough sheets of cellulose may be prepared by slicing masses of recovered cellulose after methods similar to those employed in the manufacture of sheets of celluloid, whereas if these methods are applied to the production of sheets or masses of cellulose made from viscose containing no silicate the resulting sheets lack toughness and are short and brittle.

I claim—

1. The method herein described consisting in treating viscose or the viscose solution with silicate of soda.

2. As a new article of manufacture a cellulose product derived from viscose containing silicate of soda.

In testimony whereof I have signed my name to this specification in the presence of two subscribing witnesses.

CHARLES N. WAITE.

Witnesses:
B. J. NOYES,
JOHN W. DECROW.